July 10, 1962   H. L. SEIDEN   3,043,729
SHEET FEEDING AND SEALING MACHINE
Filed June 27, 1958   5 Sheets-Sheet 3
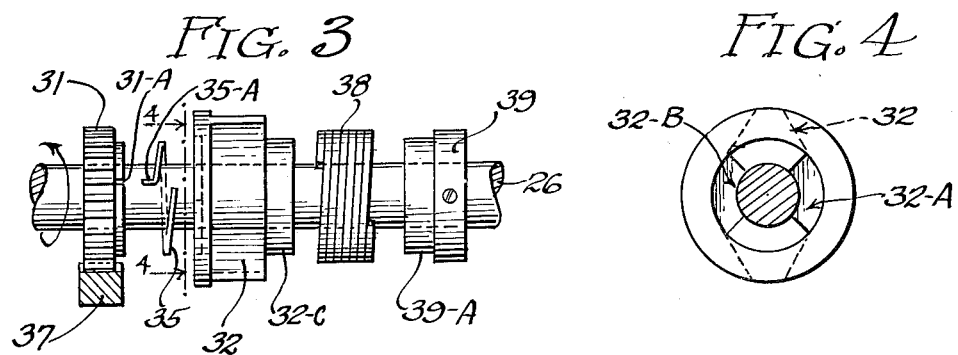
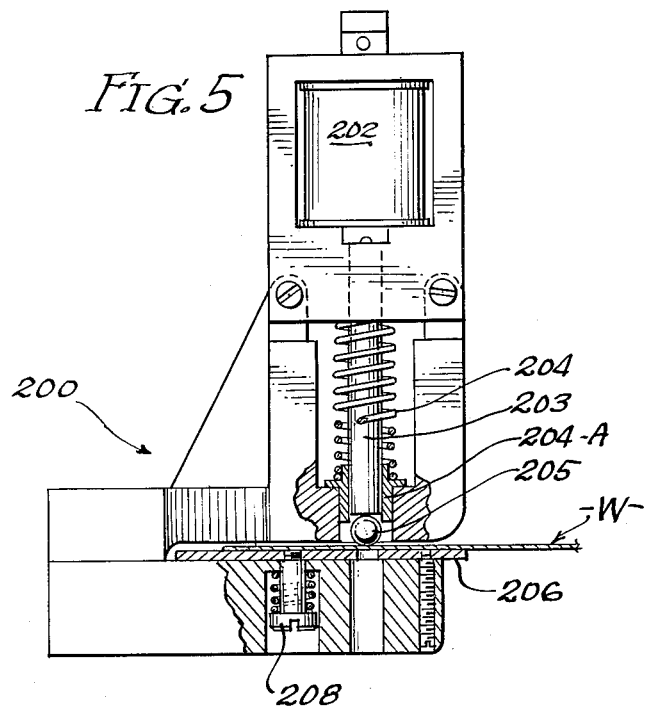
INVENTOR.
Herman L. Seiden
BY
Attorney INVENTOR.
Herman L. Seiden
BY
Attorney

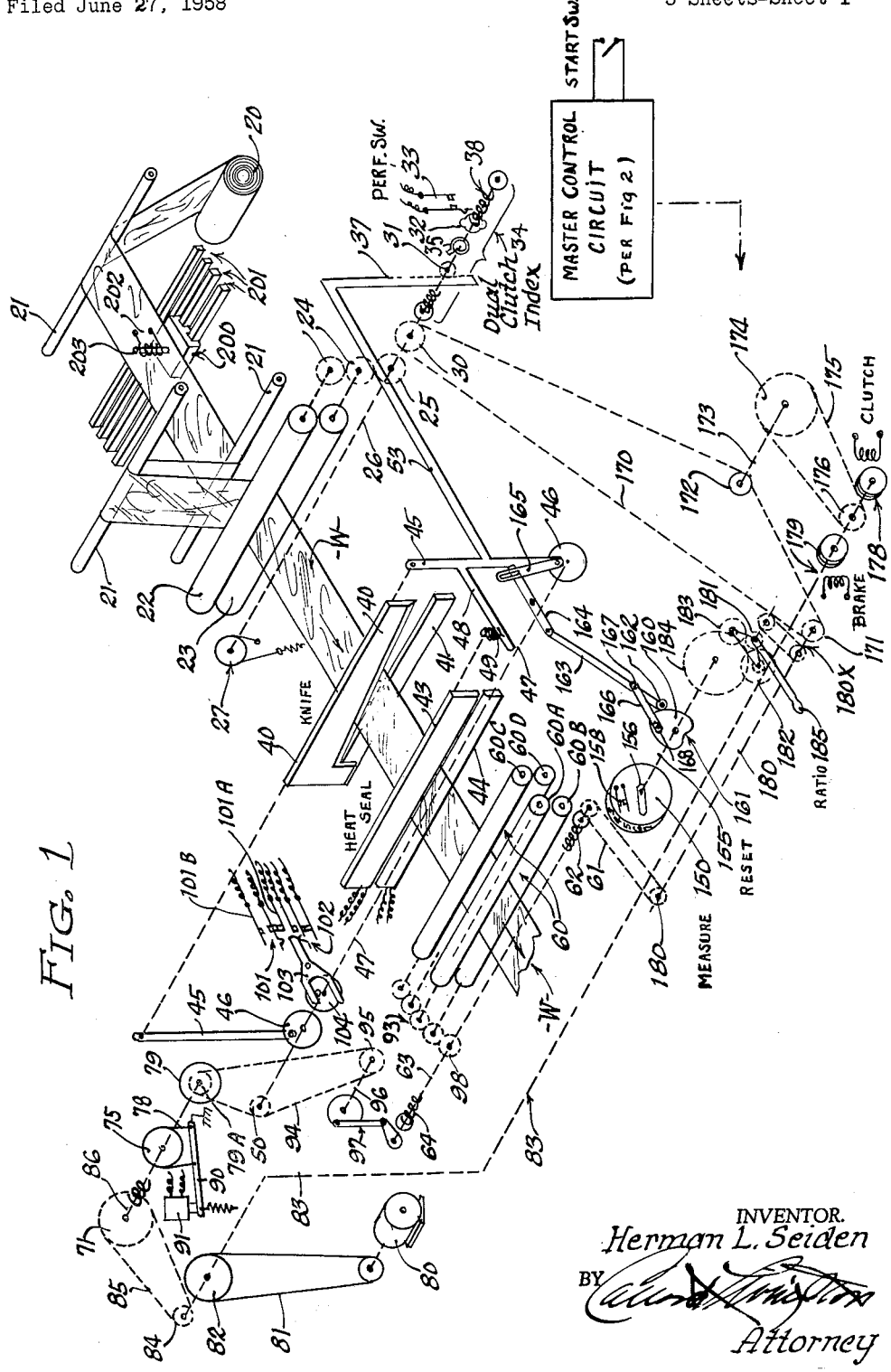

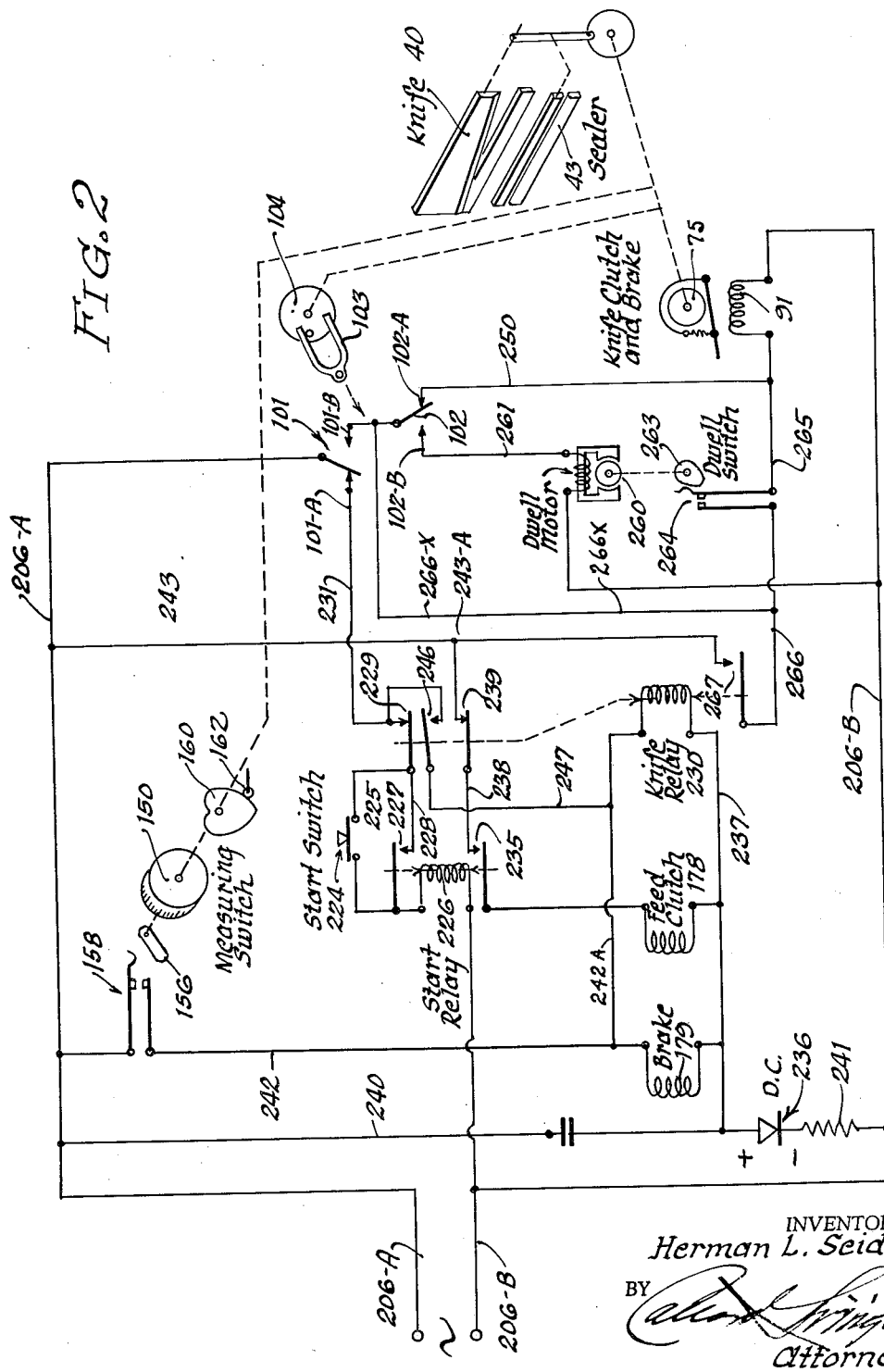

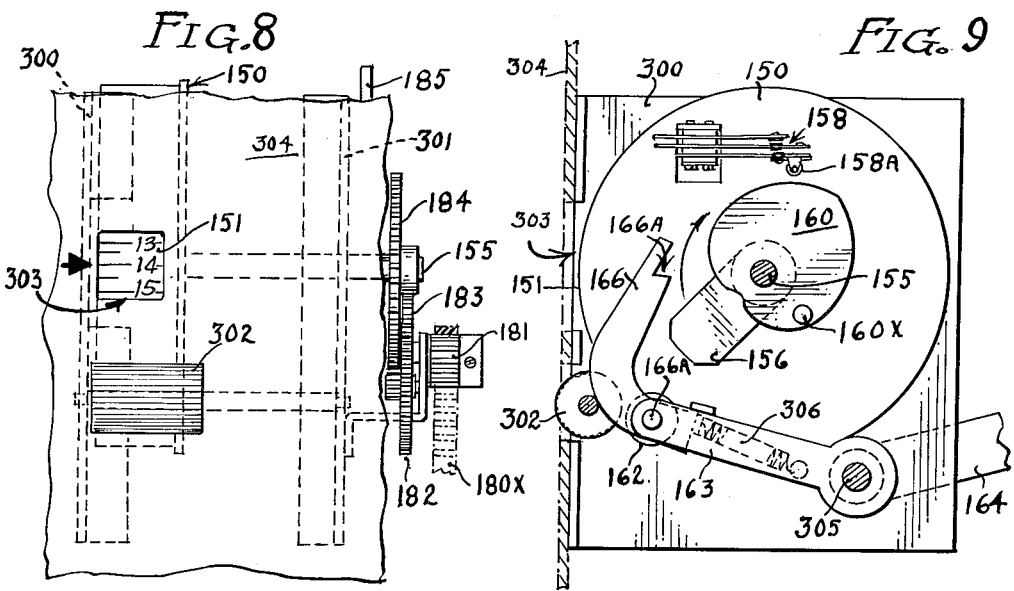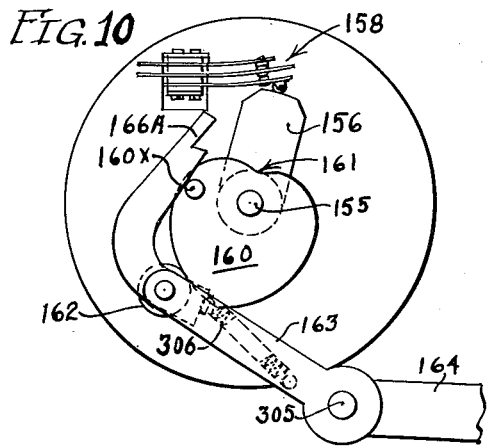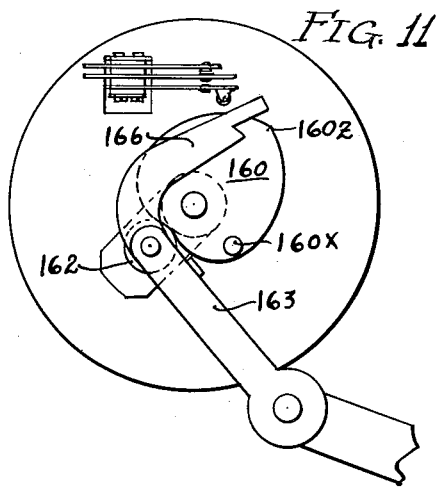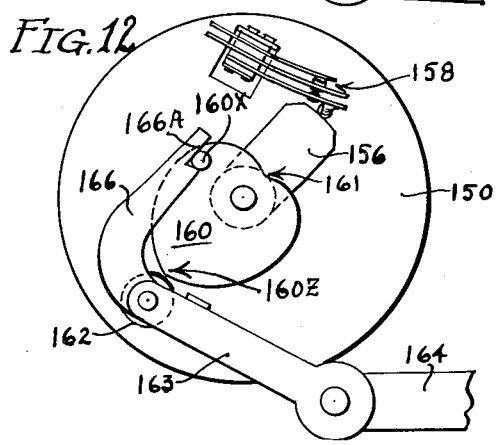

United States Patent Office 3,043,729
Patented July 10, 1962

3,043,729
SHEET FEEDING AND SEALING MACHINE
Herman L. Seiden, Chicago, Ill., assignor, by mesne assignments, to G. T. Schjeldahl Company, a corporation of Minnesota
Filed June 27, 1958, Ser. No. 745,165
15 Claims. (Cl. 156—367)

This invention pertains to sheet-feeding and sealing machinery and has as its principal object the provision of a machine of this class characterized by the provision of a positive infeed and outfeed roller drive system with a cut-off knife and heat seal means situated in between the infeed and outfeed means, together with a preselective measuring and control means coacting with the infeed rollers to control the feeding, measuring, and cut-off operations accurately.

A further feature of the device is the provision of a perforating or like means operable on the sheet material and actuated and indexed under control of the measuring means and cut-off knife.

Still another feature is the provision of an operating sequence circuit primarily controlled by the cut-off or knife system for effecting operating cycles, including accurate infeeding, cutting, sealing, and outfeeding.

Other features relate to the provision of means coacting with or controlled by the sheet cutter for indexing the perforator control switch and resetting the sheet-measuring switch means to a starting position as a function of each knife or cutter cycle; to the provision of a sealing means controlled by the cutter to seal cut lengths; to means coacting with the knife or cutter means for actuating a heated sealer bar useful in making bags out of tubular stock or cutting off the sheeting by fusion where heat-fusible stock is used and the knife is disabled or removed.

Yet another important object is the provision of dual infeed and outfeed roller means flanking the knife and acting at one time in synchrony, and at a later time with only the outfeed roller means actuated by certain auxiliary feed drive means related to the knife at the end of each cutting operation in one or two steps to move the sheeting away from the knife for sealing, and thereafter away from the sealer after sealing.

Additional objects and features of novelty and utility relate to the control system generally including the critical location and character of certain clutches, brakes, indexing and resetting means arranged and functioning in the manner and for the purpose hereafter described in view of the annexed drawings, in which:

FIG. 1 is a pictorial operating and assembly schematic of the sheet-feeding mechanism;

FIG. 2 is a circuit diagram;

FIG. 3 is a fragmentary bottom plan view of the dual clutch means with parts in exploded relation;

FIG. 4 is an end view of an indexing clutch cam viewed along lines 4—4 of FIG. 3;

FIG. 5 is a side elevation of the sheet perforator;

FIG. 8 is a front elevation of the measuring unit;

FIG. 9 is a sectional view through the unit of FIG. 8 with parts seen mainly in side elevation;

FIG. 10 is a side view and operational detail of the principal elements of the measuring unit illustrating the condition upon a completed measurement;

FIGS. 11 and 12 are views similar to FIG. 10 and respectively illustrate the full reset condition, and a dead-center condition.

Figures 6, 7:
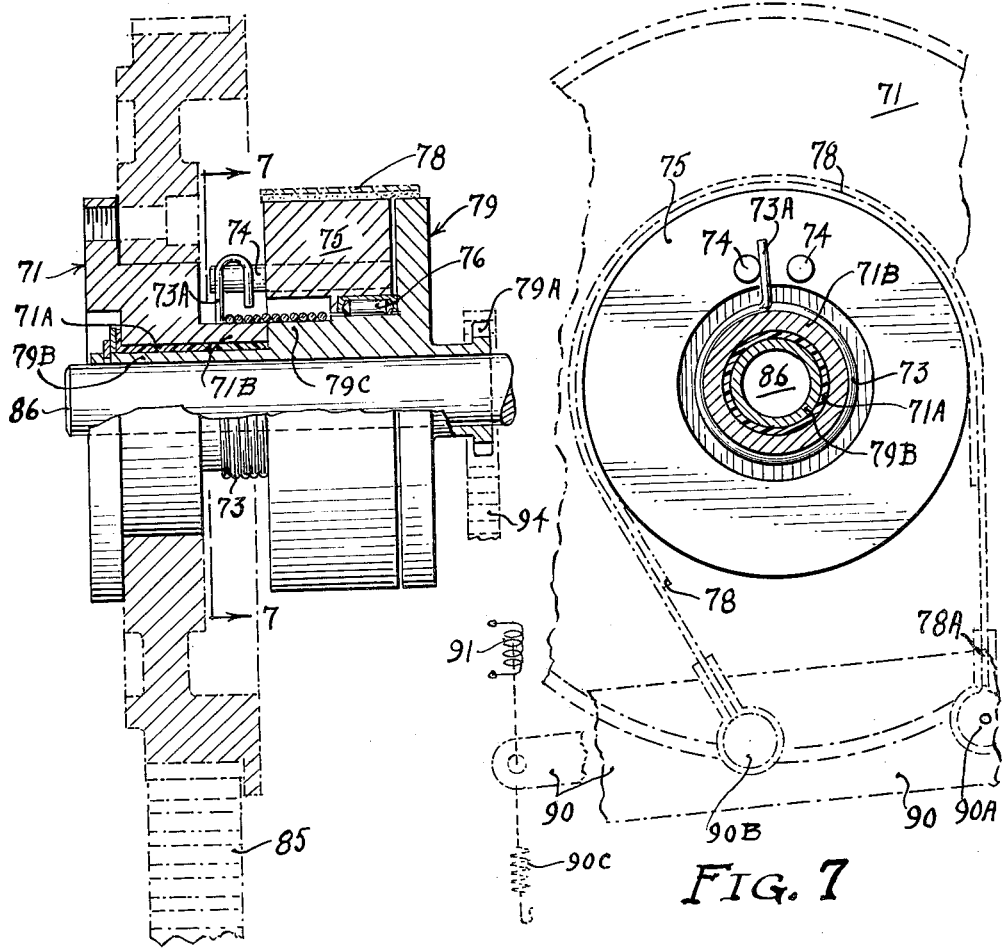
FIG. 6 is a partial side section through the brake clutch with portions shown in elevation.
FIG. 7 is a fragmentary end view along lines 7—7 of FIG. 6.

In FIG. 1 of the drawings the entire operating assembly of the sheet-feeding mechanism is illustrated in a pictorial schematic wherein the sheeting W, which may be a web of single-thickness stock or a dual-thickness tubular stock of polyethylene sheeting suitable for bag making, is reeled off a supply roll 20 and trained over a system of infeeding guiding and tensioning rollers 21 and thence between a pair of measuring and infeeding rollers 22 and 23 equipped with interdriving gears 24, one of which in turn is driven by a gear 25 on a countershaft means 26 equipped with a constant-pressure unidirectional band brake 27 adapted to prevent creeping and retrograde motion of this shaft and the measuring infeed rollers.

Also carried on said countershaft 26 is a driven measuring gear 30 and a two-lobed switch cam 32 for actuating a perforator switch 33. Connecting with this countershaft through a special dual clutch means 34 is an indexing gear 31 for setting the cam 32 at a starting position at the end of each feeding cycle on the return stroke of a knife gear rack 37, as will more fully appear hereafter.

The sheet web W is led beneath a movable overhead knife or shear 40 cooperable with a stationary shear blade 41, the web then passing between a pair of electrically heated sealer bars, the bar 43 being movable up and down in guides to press the web against the stationary sealer bar 44, following which the web W passes through a system of interdriven outfeed rollers generally indicated at 60 and consisting of four rollers arranged in two outfeeding tandem pairs, one behind the other, and both of which are contrived to be driven at different times from different sources, as will more fully appear hereinafter.

The movable shear blade 40 is reciprocable vertically in conventional guideways (not shown) guillotine fashion by means of twin cranks 45, 46, located at opposite ends thereof on a driven cross shaft 47 connecting with the driving motor 80 through a series of gear belt drives identified more fully hereinafter.

The vertically reciprocable knife or shear means 40 and the sealer bar 43 coact in that an extension 48 is provided on the knife crank means and is loosely connected as by a spring shackle link means 49 to the movable sealer bar 43 in such a relation that when the sealer bar encounters the web, there is sufficient further downwardly travel of the knife carrier to exert a pull on the spring shackle means 49 and yieldingly press the heated sealer bar against the web and the companion bar therebelow to effect a very positive heat seal, sufficient to melt the plastic sheeting so that in one mode of operation of the machine the sheeting can be severed by pulling the leading end away from the portion clamped between the sealer bars, thus dispensing with the knife for side-sealed bags.

The system employs but one motor 80 to drive the feeding, shearing, and sealing means for the entire machine in its primary mode of operation, a gear belt and gear pulley means 81, 82, driving a main power shaft 83 from the motor end of which there is another gear-belt means 84, 85, driving the knife and sealing mechanisms and one phase of the outfeed roller means through a special brake clutch including an input gear 71, and an output drum 79 and pinion 79A, with certain control drum features described more fully hereafter, the clutch being adapted to be controlled by a brake band 78 applied to the clutch control drum 75 and output drum 79 by lever and spring means 90C, 90 controlled actuated by a solenoid 91 in such manner that when the solenoid is energized the band is released and the clutch drives output pinion 79A.

The primary drive for the outfeed roller system 60 is derived from an outfeed countershaft 180 associated with the measuring system through the agency of a gear belt drive 61 driving a one-way clutch 62 on feed roller cross-shaft 63 extending across the machine to the opposite ends of the feed rollers to drive a gear 98 and a set of interdriving gears 93, for the two tandem pairs of rollers 60A—60B and 60C—60D. Thus, when the outfeed countershaft 180 rotates, feed cross-shaft 63 also rotates through primary clutch 62 and drives both pairs of outfeed rollers, while the secondary clutch 64 slips idly.

However, there is a secondary or supplemental drive for the outfeed roller system related to the shearing operation and derived from the motor brake clutch pinion 79A by gear belt 94, and the gear 95 driving outfeed crank means 97. This secondary outfeed drive action occurs twice per cycle as a function of the web-cutting operation and the rotation of the knife shaft 47 when the band clutch means 78 is effective to drive gear belt 94, countershaft 96, and crank 97, which in turn drives the secondary one-way clutch 64 on cross-shaft 63.

Thus, when the measuring shaft 155 rotates the primary outfeed countershaft 180 turns also and the main action of the system of outfeed rollers 60 occurs once per cycle through one-way clutch means 62 and cross shaft 63; while the secondary outfeed action, of lesser degree and duration, occurs twice per cycle, once after the knife means 40 completes its cutting operation, and before the sealer 43 acts, and once again as the knife ascends to normal position after each cutting and sealing operation, this secondary outfeed being effected through the crank means 97, the secondary one-way clutch means 64, countershaft 63, and gear 98 thereon.

Certain knife-cycling and dwell-control switches 101, 102, are actuated by a yoke 103 oscillated by crank pin means 104 on the knife countershaft 47 in each cutting and sealing cycle for purposes which will be explained in a summary of operation.

The measuring means, as shown in FIG. 1, consists essentially of a measuring drum 150 having numerical length designations 151 (as in FIG. 8) on its periphery to indicate inches and fractions thereof for the length of webbing to be fed and cut off, this drum being mounted to float on the measuring countershaft 155 on which is fixed a switch-actuating lever 156 acting once per revolution of the shaft to close a measuring switch 158 carried on the side of said drum.

Also fast on shaft 155 is a heart cam 160 adapted to be turned back to a zero or starting position, along with the switch-actuating lever 156, by means of a reset roller 162 on a reset lever 163 actuated once per knife cycle by means of drive links 164, 165, actuated in turn by knife crank 46 once per revolution of the knife countershaft. The reset roller 162 drops into a zero-torque depression 161 in the heart cam to arrest the latter, and hence the measuring shaft 155 and switch lever 156 at a starting position at the conclusion of each feeding and cut-off cycle.

In order to prevent any possible lock-up of the heart cam, there is provided a dead-center kick-off lever 166 connected as at 167 with the reset lever 163 and so shaped and located as always to engage a kick pin 168 on the heart cam in a certain position of the reset lever whereby to shift the peak lobe of the cam slightly beyond a dead-center position should it stop in such condition. (See also FIGS. 9 to 12.)

In measuring operation, the drum 150 will be selectively turned by the operator to a position indicating a desired length of sheeting, as a result of which the master measuring switch 158 will be moved away from the actuating lever (which is always reset to starting position) by an angular distance in corresponding ratio to the desired length indicated by the drum setting.

When the machine is in operation, the motor 80 runs continuously and drives the main power shaft 83 constantly; and the feeding and measuring operations start with the actuation of magnetic clutch 178, as a result of which the infeed countershaft 26 will be driven from gear 30, gear belt 170, gear 172 on countershaft 173 rotated by gear 174 which in turn is driven by a gear belt 175 from gear 176 on main power shaft 83.

Gear belt 170 also drives the measuring countershaft 155 through gear 171 on the outfeed countershaft 180 and a small gear belt drive 180X to a pinion 181 mounted on a shift lever in mesh with a pair of gears 182 and 183 of different size also carried by said lever either of which can be rocked into mesh with a large driven gear 184 fast on the measuring spindle 155, to give a 1:1 or 2:1 selective ratio by which the range of the drum 150 may be selectively doubled.

When the sheeting, particularly tubular stock, is to be used for bag making, it is frequently desirable to perforate the stock to provide air holes, and the machine includes an electromagnetic perforating means 200 adjustably positionable relative to the infeeding web on a selection of cross-slide bars 201. Energization of solenoid coil 202 operates a punch means 203 (FIG. 5) to perforate the web, such energization being actually effected during feeding of the sheet by actuation of perforator switch 33 responsive to rotation of cam 32 from shaft 26 through the second section (38, etc.) of the dual clutch means 34, details of which are shown in FIGS. 3 and 4, wherein the knife pinion 31 is seen to float on shaft 26 and has a notch 31A in its side receiving one laterally offset end 35A of a flat, deformed, split-spring washer 35, the opposite end portion 35B of the split portion of which is sprung out of the plane of the rest of the washer so as to catch in either of two notches 32A, 32B (180 degrees apart), formed interiorly of the switch cam 32, when the gear 31 turns in one direction, whereas in the opposite direction the sprung end 35B of the washer slips past the notches, as when the knife carrier and rack 37 move upwardly and therefore indexing gear 31 moves reversely to the normal driving direction of shaft 26.

The second section of the dual clutch means 34 is a helical-spring clutch (outfeed clutch 64 being also of this general type) and comprises the cam 32 and more particularly its hub portion 32C which is closely embraced by one end portion of a conventional helical coil spring 38, the remaining end portion of which rides on the hub 39A of a collar 39 fast on the countershaft 26 and acting so that when this shaft turns, the spring 38 grabs the cam to turn also for operation of the perforator switch means 33, heretofore described.

Thus, when the knife rack 37 goes down, washer clutch 35 slips and cam 32 stands still (shaft 26 being at rest during the knife operation); but when the rack 37 rises on return of the knife, pinion 31 carries clutch washer 35 to turn and index the cam 32 the distance of exactly one-half revolution (equal to one notch 32A or 32B) to starting position.

Indexing of the perforator cam during each feeding and cut-off cycle assures the perforations will be located properly, i.e. about every three inches along the sheet.

While the perforating means 200 constitutes the subject matter of another application, a detail thereof is illustrated in FIG. 5 wherein the solenoid 202 elevates a plunger 203 against a spring 204 having a suitable hollowed ball cage 204A at its lower end in which a steel bearing-ball 205, utilized as a punch, is freely captured above a pivoted die plate 206 over which the sheeting web runs with the punch ball rolling freely therewith until the perforator switch energizes the solenoid 202, raising the plunger for release to be sharply returned by spring 204 against the ball punch, which drives the sheeting into a die hole 207 of selected size in the plate, there being several such holes of different size located on an arc beneath the ball, the plate being shiftable about its pivot 208 to position the hole of desired size beneath the ball. Thus the rolling ball does not interfere with travel of the sheeting, and this action and the fact that the punching is very rapid, permits perforations to be done regardless of sheet motion.

While the brake clutch means 71—79, referred to under

FIG. 1, constitutes the subject matter of another invention, the especial character of its operation and construction is explained in view of FIGS. 6 and 7, wherein it is seen that the input gear drum 71 floats on a bushed bearing 71A carried on the extended hub 79B of the output pinion drum 79 floating on spindle 86.

The input gear drum has an extended hub portion 71B which abuts another hub portion 79C of the output pinion drum, and there is a helical clutch spring 73 tightly embracing both of the abutting hub portions, one end 73A of this spring being looped and extended radially so as to lie between two spaced axially-extending pins 74, as in FIG. 7, carried on the inside face of a brake drum 75 which floats on a set of needle bearings 76 carried on a part of the hub of the output pinion drum 79.

A suitable brake band 78 (FIG. 7) has one end 78A anchored on the pivot pin 90A of the operating lever 90, while the opposite band end is anchored to pin 90B located radially away from the lever pivot so that when the lever 90 is pulled down by the spring means shown schematically at 900, the band grabs the large brake drum 75 and the periphery of output drum 79, causing pin 74 to remain stationary, thereby holding the end of the clutch spring, which causes the latter to unwind and slip on the hub of the input belt gear 71, locking the same together while the drum 75 stands still.

In order to engage this clutch, solenoid 91 is energized to pull lever 90 upwardly and relieve the braking action of band 78 so that the drum 75 is free to rotate with the input gear 71 while the output pinion and drum 79 can likewise rotate because spring 73 grabs both hubs 71B and 79C under these conditions.

Certain features of the measuring switch unit are depicted in FIGS. 8 through 12. This device, however, constitutes a separate invention itself, so that only those parts thereof necessary for an understanding of the operation of the feeding machine will be detailed.

As viewed in FIGS. 8 and 9, the measuring device is contrived as a compact unit including the number drum 150 mounted on the short "countershaft" or spindle 155, which is journalled between a pair of chassis plates 300, 301, the measuring calibration on dial 151 being view through a sight opening 303 in a wall plate 304 on the machine, and there being a knurled thumbing roller 302 also journalled in this unit and pressing against the drum flange for conveniently turning the drum to the desired measurement figures.

The measuring switch 158 is secured to a side of the drum and is of the leaf-spring type with a roller 158A on one blade disposed to be engaged by the end of the actuating lever 156, which is secured to the shaft 155 along with the heart cam 160, turned by gear 184 at a rate depending on which of the shiftable gears 182, 183, is in mesh therewith as a result of selective positioning of the lever 185.

Another spindle 305 carries the reset lever 163 and roller 162 which will be rocked up and pressed against the heart cam, as in FIG. 10, for reset purposes responsive to actuation of knife link 164 on return of the knife carrier mechanism, as previously explained.

The dead-center kick-off lever 166 is pivoted as at 166A on the same pin journalling the roller, and a centering spring 306, anchored at one end on the lever 163 and at the other end on a tail of the kick-off lever, holds the latter yieldingly in the ready position shown in FIG. 9, so that, should the heart cam stop on dead center, as in FIG. 12, wherein the roller 162 confronts the peak lobe 160Z of the cam, the notched end 166A of the dead-center lever will find a pin 160X on the cam and shift the latter a small amount when levers 163, 164, move in resetting action to break the dead-center condition.

FIG. 10 shows the measuring switch 158 in an operated condition by actuator 156; and FIG. 11 shows the reset condition wherein the roller 162 is lodged in the no-torque notch 161 of the heart cam, thereby determining the zero or starting position for the same.

Operation

The operation of the machine is further explained in conjunction with the circuit diagram of FIG. 2 taken in view of the preceding description under FIG. 1.

Assuming that the motor 80 is running and the sealer bars 43, 44, are energized, and that the measuring dial has been set at 14 to procure a 14-inch length of tubular sheet stock which is to be sealed at one end to make a bag, and further assuming that the measuring switch lever 156 is at zero position by reason of having been reset in a preceding operating cycle by operation of the reset means 160—165, the operator closes the start switch 224, thereby energizing a start relay 226 from conductor 225, normally closed contacts 229 on the knife relay 230, conductor 231, and normally closed contacts 101, 101A, on the yoke-actuated knife-cycle switch, to power conductor 206A, the remaining terminal of the start relay being connected to power conductor 206B, so that the relay pulls in and at once sets up its own holding circuit at its contacts 227, conductor 228, to power on 231, via normal contact 229 on the knife relay, as previously described.

Feeding and measuring now begin with the energization of magnetic clutch 178 as a result of closure of start relay contacts 235 connecting D.C. power from source 236 (for example a rectifier), one input terminal of which connects with power line 206A via conductor 240, and the other input terminal of which connects through resistor 241 to the other side of the line 206B.

The clutch coil 178 is fed via D.C. conductor 237, said relay contacts 235, and conductor 238 via normally closed contacts 239 on the knife relay to the common side of the line at juncture 243A.

Upon energization of the magnetic clutch 178, as aforesaid, referring momentarily to FIG. 1, the main motor shaft 83 is thereby connected to the feeding countershaft 26 by the gear belt means 30, 170—176, and to the measuring countershaft 155 by gear shift means 181—185, so that the shaft 155 turns the measuring switch actuating lever 156 until it encounters and closes switch 158 (now moved to the 14-inch position) on drum dial 150, thereby energizing (FIG. 2) the brake coil 179 by power from the D.C. supply conductor 237, conductor 242, said switch 158, and the common line connection on 206A.

At this time the measuring switch also energizes the knife relay 230 via conductor 242A, and this action at once breaks the holding circuit for the start relay by opening the normally closed knife-relay contacts 229.

At this time also the knife relay breaks the operating circuit for the magnetic sheet-feeding clutch by the opening of contacts 239.

Still another result of this operation of the knife relay is the closure of its contacts 267 to energize the solenoid 91 for the knife-driving brake clutch 78, which will connect the brake clutch output pinion 79A with motor power to drive the knife shaft 47 in a cycle of operation. For this purpose, the knife relay sets up its own holding circuit via conductor 247, knife-holding contacts 246, to power feed conductor 231, and via normally closed knife cycle (yoke) switch contacts 101—101A to line 206A.

The brake clutch coil 91 is energized as aforesaid from knife relay contacts 267, conductor 266, and its branch 266X connecting with the dwell-motor (yoke) switch contact 102, which at this time is still resting on contact 102A so that operating voltage is connected to the brake clutch coil 91, via 25D, and the knife countershaft 47 now drives the cranks 45 to lower the knife and shear the web.

When the knife reaches the bottom of its downward cutting stroke, the crank pin 104 will rock the yoke 103 to open the knife cycle (yoke) switch contacts 101—101A and close the companion contact set 101—101B; and secondly, to shift dwell contact 102 to its companion contact 102B, whereby to transfer the clutch brake circuit to control by the dwell circuit by starting the dwell motor 260 with power applied via conductor 261 from dwell contacts 102—102B.

The setting of the dwell cam 263 will be such that a predetermnied number of seconds will elapse (depending on the thickness and class of plastic sheeting stock) before cam switch 264 is closed to start the knife back up and complete the cycle, it being recalled that the sealer bar 43 follows the knife down but does not engage the sheet until the shearing is completed and the knife over-travels enough to allow the sealer bar to press home. The additional few seconds dwell assures that a good heat seal will be effected.

However, before the sealer bar 43 can engage the sheeting, as aforesaid, the secondary outfeed drive is actuated a first time by crank means 97, clutch 64, and gear 98, to drive the sets of outfeed rollers 60 just enough to advance the tail of the sheared sheet from the knife position closer to the sealing position so that the seal will be made quite close to the sheared edge.

The dwell timer cam 263 rotates and permits dwell switch contacts 264 to close thereby providing a continued clutch-brake operating circuit in shunt around the now-released knife relay circuit at contacts 267, the operating power for dwell motor 260 now being supplied from the line 206A, knife-cycle contacts 101—101B, conductor 266X to conductor 266, dwell switch contacts 264, closed, and conductor 265 to clutch coil 91, so that the knife continues its cycle back to the raised starting position, at which time the yoke switch is restored to normal with contact 101 again engaging contact 101A in starting condition, and contact 102 again engaging contact 102A, thereby dropping out the clutch coil 91.

As the knife moves back toward starting position, reset lever means 162—166 turns the heart cam 160 and measuring switch lever 156 back to starting position in readiness for the next cycle.

Before the knife system finally reaches reset starting condition the secondary drive means for the outfeed roller means 60 is actuated, a second time through crank means 97, clutch 64, and gear 98, to discharge the cut and sealed sheeting therefrom.

Moreover, the rising travel of the knife system moves the indexing rack 37 upwardly to turn the indexing gear 31 through the first section of the dual clutch means 34 to set the perforator cam at its proper angular starting position relative to perforator switch 33.

I claim:

1. In a sheet-feeding machine: separate sheet-infeeding and outfeeding sets of rollers spaced apart along the path of sheet travel; a driving motor and a first electrically-actuated clutch means operable to drivingly connect and disconnect both sets of rollers simultaneously with operating power from said motor; a movable cut-off knife located between said sets of rollers and operable in duty cycles to engage, sever, and withdraw from, a fed length of said sheeting between portions thereof engaged by both sets of rollers; a second electrically-actuated clutch means operable to connect said knife means for cyclic operation by power from said motor; and master control means having circuit connection with said first and second clutch means and manually operable to actuate said clutch means in predetermined succession to operate said first sets of feed rollers and thereafter to effect duty-cycle operation of said knife means whereby to feed and then cut a length of sheeting the length of which depends on how long said first clutch means remains operated before the second clutch means is operated in each said cycle.

2. Apparatus according to claim 1 further characterized in that the said first and second clutch means have electrical actuating means connected in a sequence circuit; and said master control means comprises a starting switch, relay switch means, a knife cycle switch means operably controlled by said knife; and a manually preset measuring switch means operably controlled by said first clutch means in driven cooperation with said infeeding rollers, all connected in said sequence circuit for actuation to operate the said relay means and said clutch means in the order named in said duty cycles to feed and cut a predetermined length of said sheeting in each duty cycle responsive to operation of said starting switch.

3. Sheet-feeding apparatus according to claim 2 further characterized by the provision of a movable, heated sheet-sealing member mounted for cyclic movement into and out of sealing engagement with said sheeting at a location between said knife means and said outfeeding rollers and moved in its said operating cycle under control of movement of said knife means in each duty cycle of the latter, so as to sealingly engage said sheeting at a time following the cutting action thereon of the knife means, and to disengage the sealed sheeting cooperably with the withdrawing action of the knife means.

4. Sheet-feeding and sealing apparatus according to claim 3 further characterized in that there is provided a third clutch and a crank means cooperably driven by power controlled by the second clutch means in predetermined relation to cyclic movements of said knife means, together with a fourth clutch means operably interposed between said set of outfeeding rollers and a connection with driving power controlled by said first clutch means, whereby said third clutch means operates said set of outfeeding rollers to further advance the fed length of sheeting independently of operation of the infeeding rollers at a time following cutting operation of the knife means in each duty cycle thereof.

5. Sheet-feeding and sealing apparatus according to claim 4 further characterized in that said further sheet-advancing operation of the third and fourth clutch means occurs at least twice during each duty cycle of the knife means first at a time following the cutting operation thereof but before engagement of the sealing member with the sheeting whereby to advance the cut portion of sheeting a predetermined amount away from the knife means toward said sealing member; and a second time following disengagement of the sealing member from sealing engagement with said cut portion of sheeting whereby to further advance the latter a predetermined distance sufficient to discharge the cut and sealed portion of the sheeting fully from said set of outfeeding rollers.

6. In a sheet-feeding mechanism, the combination, with sheet-feeding rollers and drive means for actuating same of: a cut-off knife and mechanism operable by said drive means in cycles to actuate the knife once per cycle; means including an electromagnetic punch engageable with the fed sheet and operable to perforate the same at predetermined positions in the feeding direction; a perforator switch connected for operation to actuate said electromagnetic punch; a rotary perforator cam positioned for operation to actuate said switch at least once per revolution; and cam drive means operatively connecting with said first drive means to rotate said perforator cam at least once per knife cycle; and cam indexing means operatively controlled by movements of said knife for moving said perforator cam to a predetermined starting position relative to said switch once per knife cycle.

7. The combination of claim 6 further characterized in that said indexing and cam drive means includes clutch means operatively interconnecting said cam for operation by said first drive means and also by said index means at a time when said knife is in a certain phase of its operating cycle whereby the cam indexing operation under control of said clutch means occurs only at a time when the cam is not being driven by said first drive means.

8. In a sheet-feeding machine, the combination with sheet-feeding mechanism of a cyclically-operable knife positioned to cut fed sheeting once per operating cycle; drive means for actuating said feeding mechanism and said knife; an electromagnetic clutch operable to effect and interrupt a driving connection between said drive means and said sheet-feeding mechanism; control circuit means including a starting switch and relay connected for control thereby for actuating said clutch means to start the sheet feeding operation; a pre-settable measuring switch including a rotatable selector dial movable relative to an index to preselected position corresponding to desired lengths of sheeting; a measuring switch actuator selectively movable from a starting position by selective rotation of said dial and also having a driving connection synchronously related to said sheet-feeding mechanism to move proportionately to the length of sheet fed thereby; and a measuring switch connected with said circuit means and selectively positioned by movement of said dial into measuring positions to be actuated by said switch actuator to cause operation of the clutch means to stop said sheet-feeding at preselected lengths as aforesaid; together with means operatively controlled by said knife once per operating cycle thereof to reset said switch actuator to said starting position thereof.

9. In a sheet-feeding machine, a cyclically operable sheet-cutting means, and dual sheet-feeding means operable to advance a web of sheeting relative to said cutting means and including infeed roller means on the approach side of said cutting means and outfeed roller means on the departing distal side thereof in the direction of sheet advance; feed-measuring means and drive means cooperative to actuate said dual feeding means in synchronism to feed selected lengths of sheet to and past said cutting means, and to operate the latter through a cutting cycle at the termination of each measured feeding operation; and auxiliary driving means interconnecting said cutting means and only the outfeed roller means and operative following completion of each cutting operation to further advance a cut length of sheeting in a direction away from the cutting means.

10. Apparatus according to claim 9 further provided with heat-sealing means located on the distal side of said cutting means between the latter and said outfeed roller means and fed sheeting and including a movable sealer member and means drivingly interconnecting the same with said cutting means for movement thereby following completion of each cutting operation to engage the cut length near the trailing end thereof at a time following said further advance of the cut length.

11. Apparatus according to claim 10 further characterized in that said auxiliary driving connection has an operating ratio relative to said cutting cycle effective to produce a second advance of the cut and sealed sheet following operation of the sealing means as aforesaid, whereby to strip and advance the sealed sheeting away from said sealing means in the interval just prior to conclusion of said cutting cycle.

12. In a sheet-feeding machine, driven feed roller means for feeding a web of sheeting; electrically-controlled sheet-perforating mechanism positioned to be continuously engaged by the moving sheet web in advance of movement thereof toward and into feeding engagement with said feed roller means; a web cutter movable in cutting cycles into and out of cutting engagement with the sheeting web beyond the departing side of said feed roller means; drive motor means and countershaft means driven thereby and connected by a master clutch means for operation to start and stop said roller means in feeding action and actuate said cutter in cutting cycles at respectively predetermined different times in each feeding action; a perforator switch connected for operation to actuate said perforating device; perforator cam means driven through reverse dual clutch means from said countershaft means at a time when said countershaft means is in driving motion; and rack and gear means actuated by movement of said cutter in each cycle thereof to move the cam means to a predetermined index position at a time when said countershaft means is at rest, whereby perforating action will be started at a predetermined indexed location on the sheeting in relation to feeding engagement of the web with the said feed roller means, together with control means for manually starting and automatically stopping said master clutch means.

13. In a sheet-feeding machine of the type having feed-roller means, a sheet cutter and drive means therefor operated to actuate the cutter in cycles in timed relation to feeding operations of the roller means, together with control means including a pre-settable measuring device having a measuring switch and a switch-actuator cooperable with said feed roller means to move from a reset starting position to actuate said switch in each measuring operation for controlling operation of the feed roller means and cutter as aforesaid, improvements comprising, namely: means for resetting said switch actuator to said starting position as a function of each cutter cycle, and comprising a driving connection between said cutter and actuator, and operated in that phase of the cutter cycle which follows completion of the sheet-cutting operation thereof to reset the actuator to starting position as aforesaid.

14. In a sheet-feeding machine, a measuring roller revoluble proportionately with the fed sheet, a settable measuring drum selectively set angularly for desired lengths of sheet, a stopping switch movable with the drum; a feed motor and electrically controlled clutch means drivingly connecting same to operate said feed rollers; control-circuit means including a starting switch and said stopping switch connected for operation to start and stop feeding action; and switch-actuating means rotating from a starting position in step with said measuring roller for actuating the stopping switch at the selectively set positions thereof determined by setting of said drum; a sheet-cutting device and electromagnetic clutch means operable to connect the same for operation by driving power derived from said feed motor; circuit means controlled by said stopping switch actuated as aforesaid for operating said clutch means to operate said cutting device at the conclusion of each measured feeding operation; and means actuated by said cutter as a function of the cutting operation thereof for resetting said actuator to said starting position.

15. In a sheet-feeding machine dual sets of feed rollers flanking a cutter in the direction of feeding travel; a drive motor and motor clutch means operable to drive the said sets of rollers in synchrony to feed a length of sheet; means actuated automaticaly in timed relation to each feeding operation of said sets of rollers for operating said cutter; and auxiliary clutch and drive means powered by said drive motor and operated by a circuit controlled by said cutter, for additionally actuating the set of said rollers on the departing side of the cutter in the direction of sheet travel.

References Cited in the file of this patent
UNITED STATES PATENTS

| | | |
|---|---|---|
| 2,278,032 | Youngman | Mar. 31, 1942 |
| 2,629,440 | Shaw | Feb. 24, 1953 |
| 2,785,748 | Von Stoeser | Mar. 19, 1957 |
| 2,800,163 | Rusch | July 23, 1957 |
| 2,882,956 | Weist | Apr. 21, 1959 |
| 2,884,988 | D'Angelo | May 5, 1959 |